S. SEWALL, Jr.
Animal-Traps.
No. 206,836. Patented Aug. 6, 1878.
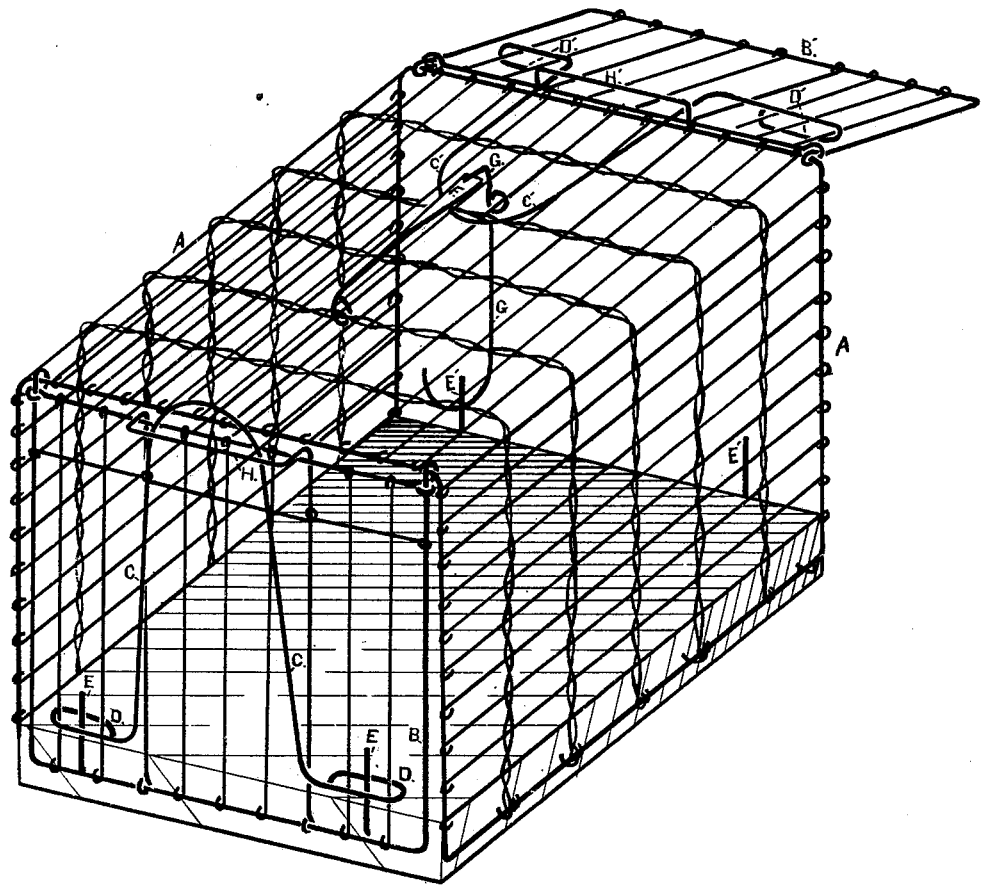

UNITED STATES PATENT OFFICE.

SAMUEL SEWALL, JR., OF LOWELL, MASSACHUSETTS.

IMPROVEMENT IN ANIMAL-TRAPS.

Specification forming part of Letters Patent No. 206,836, dated August 6, 1878; application filed May 14, 1877.

*To all whom it may concern:*

Be it known that I, SAMUEL SEWALL, Jr., of Lowell, in the county of Middlesex and State of Massachusetts, have invented Improvements in Animal-Traps, of which the following is a specification:

This invention relates to animal-traps; and consists, first, in providing a sliding handle to the door of the trap; and, secondly, in the combination, with the doors of the traps, of sliding loops and pins or catches projecting from the bottom of the cage or trap.

The drawing shows an oblique view of the trap embodying my invention, in which—

A is the trap; B B', the doors; C C', the handles; D D D' D', the loops; E E E' E', the catches; F, the lever; G, the bait-hook; H H', loops at the tops of the doors to keep the handles in position. The loops D D' fit loosely around bars near the sides of the doors, and are kept in position by being connected together by the wire, which also forms the handle, and guided by loops H H'.

To open the door the handle is raised, and the trap is set in the usual manner, the handles being held under the lever F and secured by the bait-hook G. When the trap is sprung the handle will drop with the door and the loops fall over the catches, securely fastening the door, which may be easily opened, when desired, by raising the connected loops the height of the pins or catches, and then turning back the handles in the usual manner.

Traps have heretofore been made with a handle rigidly secured to the door, projecting above the top of the trap when the door is closed.

By my improvement I am enabled to provide a more compact form of trap.

Having thus described my invention, what I claim as new is—

1. In an animal-trap, a door provided with a sliding handle, substantially as described, and for the purpose set forth.

2. The combination of the door B, the loop D, and catch E, substantially as and for the purpose set forth.

3. The combination of the door B, the loops D D, handle C, catches E E, and lever F, substantially as described, and for the purpose set forth.

4. The combination of the sliding handle C, door B, loops D D, catches E E, lever F, and bait-hook G, substantially as described, and for the purposes set forth.

SAML. SEWALL, JR.

Witnesses:
SAMUEL SEWALL,
NATHANIEL HILL.